United States Patent Office 2,838,531
Patented June 10, 1958

2,838,531
6-FLUORO-17α-HYDROXYPREGNANES AND ESTERS

John C. Babcock, Portage Township, Kalamazoo County, and J Allan Campbell and John A. Hogg, Kalamazoo Township, Kalamazoo County, Mich., assignors to The Upjohn Company, Kalamazoo, Mich., a corporation of Michigan No Drawing. Application February 19, 1958
Serial No. 716,002

10 Claims. (Cl. 260—397.4)

The present invention relates to steroid compounds and is more particularly concerned with the novel 6-fluoro-17α-hydroxy-1-allopregnene-3,20-dione, 6-fluoro-17α-hydroxy-1,4-pregnadiene-3,20-diones (both the 6α- and 6β-fluoro isomers) and 17-esters thereof, and the novel intermediates in the production thereof.

The novel compounds and the process of the present invention are illustratively represented by the following formulae:

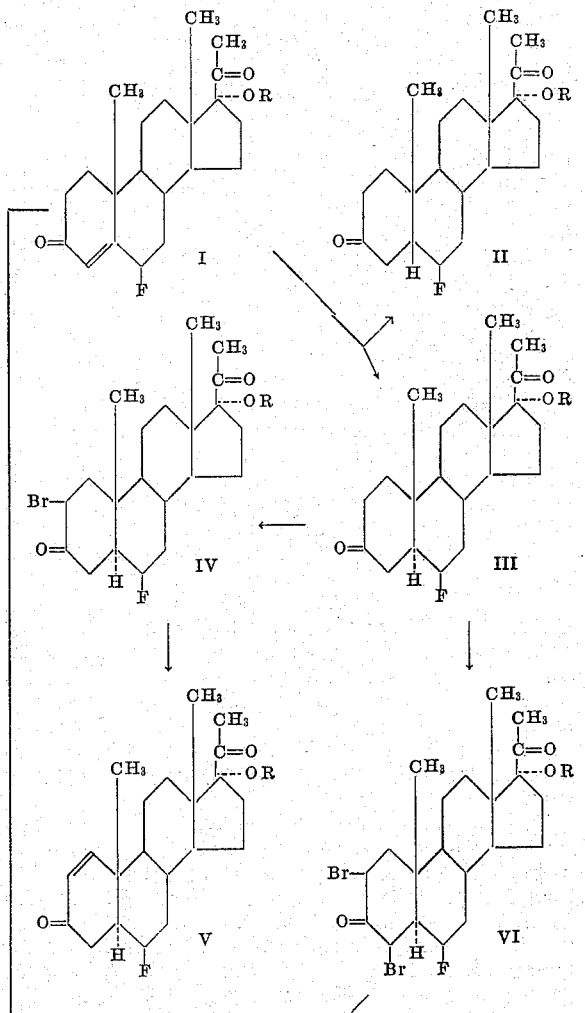

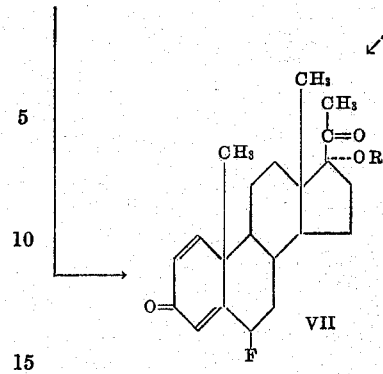

wherein R is hydrogen or the acyl radical of an organic carboxylic acid, preferably a hydrocarbon carboxylic acid containing from one to twelve carbon atoms, inclusive, and wherein F represents a fluorine atom in a position selected from α and β.

It is an object of the instant invention to provide 6-fluoro-17α-hydroxy-1-allopregnene-3,20-dione and 6-fluoro-17α-hydroxy-1,4-pregnadiene-3,20-dione (both the 6α- and 6β-fluoro isomers) and 17-esters thereof. It is another object of the instant invention to provide methods for the production of the novel compounds and novel intermediates. Other objects of this invention will be apparent to those skilled in the art to which this invention pertains.

The new products 6-fluoro-17α-hydroxy-1,4-pregnadiene-3,20-diones and 17-esters thereof have utility as oral and parenteral progestational agents. Owing to their progesterone-like effects, the compounds of this invention find application in "cyclic" therapy, where estrogenic and progestational hormones are supplied together or in succession so as to favor re-establishment of normal endometrium-ovary-anterior pituitary relationships in cases of menstrual disturbances.

In addition they affect the secretion of gonadotropins and thus regulate ovulation and endometrial and placental development and, particularly when used in conjunction with estrogens or androgens reduce fertility. The novel compounds are effective in the therapy for dysmenorrhea, amenorrhea, endometriosis, threatened abortion and related gynocological disorders.

The novel compounds of this invention can be prepared and administered in a wide variety of oral or parenteral dosage forms, singly, or in admixture with other coacting compounds. They can be associated with a pharmaceutical carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, lotions and the like, with or without coacting antibiotics, germicides or other materials forming advantageous compositions therewith.

The process of the present invention comprises: hydrogenating a 6-fluoro-17α-hydroxyprogesterone or a 17-ester thereof (I) with hydrogen in the presence of a palladium catalyst to obtain the corresponding saturated compounds 6-fluoro-17α-hydroxypregnane-3,20-dione (II) and 6-fluoro-17α-hydroxyallopregnane-3,20-dione (III)

or respectively the 17-esters thereof; brominating the thus obtained 6-fluoro-17α-hydroxyallopregnane-3,20-dione or a 17-ester thereof (III) with one to 1.2 mole of bromine per mole of steroid to give the corresponding 2-bromo-6-fluoro-17α-hydroxyallopregnane-3,20-dione or 17-esters thereof (IV); and dehydrobrominating the thus obtained 2-bromo-6-fluoro-17α-hydroxyallopregnane-3,20-dione or a 17-ester thereof to give 6-fluoro-17α-hydroxy-1-allopregnene-3,20-dione or a 17-ester thereof (V). Brominating 6-fluoro-17α-hydroxyallopregnane-3,20-dione or a 17-ester thereof (III) with two moles of bromine per mole of steroid produces the 2,4-dibromo-6-fluoro-17α-hydroxyallopregnane-3,20-dione or 17-acylate thereof (VI) which compounds are dehydrobrominated to give 6-fluoro-17α-hydroxy-1,4-pregnadiene-3,20-dione or respectively the 17-acylates thereof (VII). The 17-esters can also be obtained by acylation of the 17-hydroxy group of the final products, 6-fluoro-17α-hydroxy-1-allopregnene-3,20-dione and 6-fluoro-17α-hydroxy-1,4-pregnadiene-3,20-dione, with the appropriate acylating agent in conventional manner.

Alternatively 6-fluoro-17α-hydroxy-1-allopregnene-3,20-dione of formula V, can be prepared from 6-fluoro-17α-hydroxyallopregnane-3,20-dione (III) or a 17-ester thereof by microbiological dehydrogenation for example with *Septomyxa affinis*, A. T. C. C. 6737. In the same manner microbiological dehydrogenation for example with *Septomyxa affinis* of 6-fluoro-17α-hydroxyprogesterone or a 17-ester thereof gives 6-fluoro-17α-hydroxy-1,4-pregnadiene-3,20-dione (VII). The resulting 6-fluoro-17α-hydroxy-1-allopregnene-3,20-dione (V) or, respectively, 6-fluoro-17α-hydroxy-1,4-pregnadiene-3,20-dione (VI) can, if desired, be esterified to give the corresponding 17-esters.

By a third method, for the biological dehydrogenation can be substituted a chemical dehydrogenation with selenium dioxide, often for increased yield in the presence of an element of group II of the periodic system, such as mercury, cadmium, zinc or elements of group VIII of the periodic system such as iron, nickel, cobalt or the like.

The starting compounds of the present invention are 6-fluoro-17α-hydroxyprogesterone and 17-esters thereof, produced as shown in Preparations 1 through 18.

In carrying out the process of the present invention, the first step involves hydrogenation of the 4,5-double bond of a 6-fluoro-17α-hydroxyprogesterone or a 17-ester thereof. The hydrogenation can be accomplished with hydrogen in the presence of a catalyst such as palladium supported on charcoal, and is usually conducted in a solvent medium. Alkanols, hexane, acetone, methyl ethyl ketone, dioxane, acetic acid, ethyl acetate, or like organic solvents may be advantageously employed, with ethyl alcohol being preferred. The catalyst can be saturated with hydrogen prior to the introduction of the steroid or preferably the steroid, catalyst and supporting media can be contacted together in a solvent medium prior to introduction of the hydrogen. It is not necessary to conduct the reaction under pressure, although, when pressure is utilized, a hydrogen pressure of about one to 100 pounds or more is operative, a pressure of from about twenty to forty pounds is preferred. Any suitable temperature between about zero and 100 degrees centigrade may be employed, with room temperature being satisfactory. Hydrogenation is continued until approximately one molar equivalent of hydrogen has been absorbed. The catalyst is then separated from the solution by filtration and the hydrogenated products are isolated by removal of the solvent. Usually the crude hydrogenation product is a mixture containing both the normal and the allo isomers, i. e., 6-fluoro-17α-hydroxypregnane-3,20-dione and 6-fluoro-17α-hydroxyallopregnane-3,20-dione or the 17-esters thereof. The isomers are separated by conventional means such as for example, fractional crystallization or chromatography. Alternatively the normal and allo isomers can be conveniently separated by reaction of the mixture with pyrrolidine to form the 3-pyrrolidyl enamine. The 3-pyrrolidyl enamine of the allo isomer is the least soluble in the reaction mixture and crystallizes out leaving the 3-pyrrolidyl enamine of the normal isomer in solution. After separation, for example, by filtration, the enamine group is removed by treatment with base or with water to regenerate the 3-ketone and produce the corresponding 6-fluoro-17α-hydroxypregnane-3,20-dione or 6-fluoro-17α-hydroxyallopregnane-3,20-dione, or the 17-esters thereof.

The allo isomer thus produced, i. e. a 6-fluoro-17α-hydroxyallopregnane-3,20 dione or a 17-ester thereof is brominated at position 2. Bromination is conducted between a temperature of zero to forty degrees centigrade with room temperature being usually satisfactory. The reaction is carried out in an organic solvent for a period of a few minutes to about 24 hours. In the preferred embodiment of the reaction, bromine, usually in solution in the reaction solvent, is added to a solution of the steroid, dissolved in the reaction solvent. Reaction solvents employed are, for example, acetic acid, propionic acid, chloroform, methylene chloride, benzene, chlorobenzene, carbon tetrachloride, hexane, ether, and the like, with acetic acid being the preferred solvent. The amount of bromine used in the reaction is usually from about one to 1.2 moles of bromine per mole of steroid. It is sometimes advantageous, to add a small amount of hydrobromic acid solution to the reaction mixture in order to facilitate initiation of the bromination. When the reaction is completed, the product is drowned out by the addition of water and isolated by any conventional means such as filtration or extraction with a water-immiscible solvent. The crude product, 2-bromo-6α-fluoro-17α-hydroxyallopregnane-3,20-dione or a 17-ester thereof, can be purified by crystallization from an organic solvent or it can be used directly in the dehydrobromination step without purification.

In the dehydrobromination step of the present invention, the starting 2-bromo steroid is usually dissolved in the dehydrohalogenation agent, if it is a liquid solvent for the steroid, or both the dehydrohalogenation agent and the steroid are dissolved in a substantially inert diluent and then heated, usually at a temperature substantially above room temperature, e. g., between about fifty and about 250 degrees centigrade, for about fifteen minutes to several hours, although the reaction ordinarily begins as soon as the heating commences.

Dehydrohalogenation agents which may be employed include, dimethylformamide, often in presence of lithium chloride, basic substances such as potassium acetate, pyridine and the alkyl pyridines, e. g., the picolines, β-lutidines, α,β-collidines, γ-collidines, and the like.

Ordinarily, the dehydrohalogenation agent is employed in a ratio to the starting steroid of about four to one or greater. On completion of the reaction, the reaction mixture is cooled and poured into a dilute solution of an acid, preferably a mineral acid, e. g., sulfuric acid. The product, 6-fluoro-17α-hydroxy-1-allopregnene-3,20-dione or a 17-ester thereof, is extracted from the acid mixture with a water-immiscible solvent such as, for example, methylene chloride and is purified by conventional means such as recrystallization, chromatography, or both.

The preparation of 6-fluoro-17α-hydroxy-1,4-pregnadiene-3,20-dione or 17α-esters thereof from 6-fluoro-17α-hydroxyallopregnane-3,20-dione or 17α-esters thereof is carried out in the same manner as for the 6-fluoro-17α-hydroxy-1-allopregnene-3,20-dione and 17-esters except that in the bromination step from 2 to 2.5 moles of bromine per mole of steroid are employed, thus causing the production of the 2,4-dibromo compound, 2,4-dibromo-6-fluoro-17α-hydroxyallopregnane-3,20-dione or 17-esters thereof (compound VI).

Alternatively the compounds of the present invention, can be prepared by microbiological or selenium dioxide dehydrogenation at the 1-position. Dehydrogenation of 6α-fluoro-17α-hydroxyallopregnane-3,20-dione or 6β-fluoro-17α-hydroxyallopregnane-3,20-dione with *Septomyxa affinis,* A. T. C. C. 6737 is productive of 6α-fluoro-17α-hydroxy-1-allopregnene-3,20-dione or respectively 6β-fluoro-17α-hydroxy-1-allopregnene-3,20-dione. Dehydrogenation of 6α-fluoro-17α-hydroxyprogesterone with *Septomyxa affinis* A. T. C. C. 6737 or selenium dioxide is productive of 6-fluoro-17α-hydroxy-1,4-pregnadiene-3,20-dione.

The compounds of this invention, represented by Formulas V and VII, may be utilized either as the free alcohols or as the esters. Esterification is carried out by methods well established in the art for esterifying tertiary hydroxyl groups, e. g., Huang-Minlon et al., J. Am. Chem. Soc., 74, 5394 (1952). Huang-Minlon et al. describe both a "cold method" and a "hot method" both of which are useful in the esterification of 6-fluoro-17α-hydroxy-1-allopregnene-3,20-dione or 6-fluoro-17α-hydroxy-1,4-pregnadiene-320-dione. Esterification is accomplished by allowing the hydroxy compounds to react with the anhydride or the acyl halide of an organic carboxylic acid, preferably a hydrocarbon carboxylic acid containing from one to twelve carbon atoms, inclusive, for example, a saturated straight-chain aliphatic acid, such as acetic, propionic, butyric, valeric, hexanoic, lauric; a saturated branched-chain aliphatic acid, e. g., trimethylacetic, isobutyric, isovaleric; a cycloaliphatic saturated acid, e. g., cyclohexanecarboxylic acid, β-cyclopentylpropionic; an alkaryl acid, e. g., phenylacetic, 2-phenyl-propionic, o-, m-, and p-toluic; a saturated dibasic acid (which can be converted into water-soluble, e. g., sodium salts), e. g., succinic, adipic; a monobasic unsaturated acid, e. g., acrylic, crotonic, undecylenic, propiolic, cinnamic; a dibasic unsaturated acid (which can be converted into water-soluble, e. g., sodium salts), e. g., maleic and citraconic.

The following preparations and examples are illustrative of the products and process of the present invention and are not to be construed as limiting.

PREPARATION 1

*17α-hydroxyprogesterone acetate*

One hundred grams (0.303 mole) of 17α-hydroxyprogesterone was dissolved in 1340 milliliters of acetic acid in a two liter round bottom flask equipped with stirrer, thermometer, and nitrogen inlet and outlet. Solution was accelerated by stirring and warming to about fifty degrees centigrade. The solution was cooled to eighteen to twenty degrees centigrade, and 340 milliliters of acetic anhydride added. The system was flushed with nitrogen, and forty grams of p-toluenesulfonic acid added with vigorous stirring and cooling to below about 22 degrees centigrade. The reaction mixture was allowed to stand for a period of two hours and then poured into six liters of ice water and was kept at zero to five degrees centigrade for a period of about thirteen to fifteen hours, whereupon the crude acetate was filtered off and washed several times with water. The product weighed 101 percent of theory and melted at 217 to 245 degrees centigrade. It was purified by recrystallization from methanol containing aqueous sodium hydroxide to yield 76 grams of the purified 17α-hydroxyprogesterone 17-acetate of melting point 243 to 248 degrees centigrade and rotation $[\alpha]_D$ plus 69 degrees in chloroform.

PREPARATION 2

*17α-hydroxyprogesterone 17-phenylacetate*

In the same manner as the above preparation, 17α-hydroxyprogesterone 17-phenylacetate is prepared using a mixture of phenylacetic acid (500 grams) and phenylacetic anhydride (500 grams). One thousand milliliters of benzene is employed to provide a liquid reaction mixture. The product, 17α-hydroxyprogesterone 17-phenylacetate is recovered in good yield by adding water to the reaction mixture, separating the organic layer after it has stood for a period of about two hours, then washing the organic layer with water followed by an aqueous solution of sodium carbonate, followed again by a water-wash and finally evaporating to dryness. The residual crude product is purified by recrystallization from methanol to give 17α-hydroxyprogesterone 17-phenylacetate.

PREPARATION 3

*17α-hydroxyprogesterone 17-formate*

To a solution containing one gram of 17α-hydroxyprogesterone, five milliliters of formic acid was added, then six drops of perchloric acid. The solution was covered with nitrogen and after standing for eighteen hours at room temperature the solution was diluted with water. The precipitate of 17α-hydroxyprogesterone formate was collected and recrystallized from acetone to give pure 17α-hydroxyprogesterone 17-formate of melting point 216 to 220 and rotation $[\alpha]_D$ of plus 86 degrees in chloroform.

*Analysis.*—Calcd. for $C_{22}H_{30}O_4$: C, 73.71; H, 8.44. Found: C, 73.46; H, 8.41.

PREPARATION 4

*17α-hydroxyprogesterone caproate*

Following the procedure of Preparations 1 and 2, 17α-hydroxyprogesterone caproate is prepared using a mixture of caproic acid and caproic anhydride.

In a manner corresponding to that of the foregoing preparation 17α-hydroxyprogesterone phenylpropionate, 17α-hydroxyprogesterone 2-furoate, 17α-hydroxyprogesterone acrylate, 17α-hydroxyprogesterone valerate, 17α-hydroxyprogesterone trimethylacetate, 17α-hydroxyprogesterone t-butylacetate, 17α-hydroxyprogesterone cyclopentylcarboxylate, 17α-hydroxyprogesterone ethylbutyrate, 17α-hydroxyprogesterone cyclohexylacetate, 17α-hydroxyprogesterone o-toluate, 17α-hydroxyprogesterone monoglutarate, 17α-hydroxyprogesterone β-cyclopentylpropionate, 17α-hydroxyprogesterone mono-β,β-dimethylglutarate, 17α-hydroxyprogesterone laurate, 17α-hydroxyprogesterone butyrate, 17α-hydroxyprogesterone propionate, 17α-hydroxyprogesterone isovalerate, 17α-hydroxyprogesterone enanthate and 17α-hydroxyprogesterone caprylate are prepared by dissolving 17α-hydroxyprogesterone in a solution comprising a mixture of the appropriate acid and its anhydride together with p-toluenesulfonic acid. The crude ester is isolated in accordance with the procedure of the foregoing preparations, if necessary subjected to a selective hydrolysis of the enol ester group, and recrystallized to give the 17α-hydroxyprogesterone ester. If the corresponding acid or its anhydride is solid, an inert solvent such as benzene, chloroform or dioxane can be added to effect solution and to provide a liquid esterification reaction medium.

PREPARATION 5

*17α - hydroxyprogesterone 17 - acetate, 3 - ethylene ketal*

A solution was prepared containing ten grams of 17α-hydroxyprogesterone 17-acetate in fifty milliliters of chloroform. Thereto was added 100 milliliters of ethylene glycol containing 500 milligrams of paratoluenesulfonic acid monohydrate. The mixture was concentrated with stirring at atmospheric pressure under nitrogen until the temperature reached about 75 degrees centigrade. The pressure was then reduced to remove the last traces of chloroform. Forty-eight milliliters of distillate was collected over one half hour as the product precipitated. The mixture was then cooled with stirring, one milliliter of pyridine was added followed by 200 milliliters of five percent aqueous sodium carbonate solution. The mixture was filtered and the product washed with sodium carbonate. The moist filter cake was taken up in methylene chloride. The organic layer was removed, washed with water, dried over anhydrous magnesium sulfate, and evaporated to give a white crystalline cake containing 10.9 grams of crude 17α-hydroxyprogesterone 17-acetate, 3-ethylene ketal of melting point 240 to 244 degrees centigrade and rotation [α]$_D$ minus 39 degrees in chloroform.

Analysis.—Calcd. for $C_{25}H_{36}O_5$: C, 72.08; H, 8.71. Found: C, 71.56; H, 8.47.

PREPARATION 6

17α - hydroxyprogesterone 17 - phenylacetate, 3 - ethylene ketal

A solution was prepared containing five grams of 17α-hydroxyprogesterone 17-phenylacetate in 100 milliliters of benzene, ten milliliters of ethylene glycol and 0.25 gram of para-toluenesulfonic acid monohydrate. This mixture was refluxed for a period of seventeen hours using a calcium carbide water-trap to remove the water formed in the reaction. After this period of reflux one milliliter of pyridine was added to the solution, and the mixture was cooled to room temperature. The lower glycol layer was separated and washed with benzene. The benzene layer and the washings with benzene were combined, washed with five percent sodium carbonate solution, water and saturated sodium chloride solution. After being dried over anhydrous magnesium sulfate, the solution was concentrated to dryness at reduced pressure. The residue was recrystallized twice from hot methylene chloride, and once from acetone to give pure 17α-hydroxyprogesterone 17-phenylacetate, 3-ethylene ketal.

In the same manner as shown in Preparation 5, other 17α-hydroxyprogesterone 17-acylate, 3-alkylene ketals are prepared by reaction at reflux temperature solutions of 17α-hydroxyprogesterone acylates in benzene, toluene, hexane, heptane, or other inert organic solvents with 1,2-alkane diols or 1,3-alkane diols such as butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

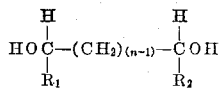

wherein $n$ is an integer having a value from one to two, inclusive, and $R_1$ and $R_2$ are selected from the group consisting of hydrogen and lower alkyl radicals containing up to six carbon atoms and wherein the total number of carbon atoms in the alkane diol is up to and including eight carbon atoms, in the presence of a strong acid such as toluenesulfonic acid, ortho-chlorobenzenesulfonic acid, sulfuric acid, and the like, to obtain the corresponding 17α-hydroxyprogesterone 17-acylate, 3-alkylene ketal. Representative 17α - hydroxyprogesterone 17 - acylate, 3 - alkylene ketals include the 17α - hydroxyprogesterone 17 - caproate, 3,20 - bis - (1,3 - propylene ketal); 17α-hydroxyprogesterone - 17 - hemisuccinate 1,2 and 1,3-butylene diketal; 17α - hydroxyprogesterone 17 - propionate 1,2-, 1,3- and 2,3-pentylene diketal; 17α-hydroxyprogesterone 17 - phenylpropionate; 3 - ethylene ketal; 17α - hydroxyprogesterone 17 - butyrate and 17 - valerate, 3 - ethylene ketals; 17α - hydroxyprogesterone 17 - benzoate, 3 - propylene ketal; 17α - hydroxyprogesterone 17-hexanoate and cyclohexylformate, 3-ethylene ketals; 17α-hydroxyprogesterone 17-laurate, 3-ethylene and 3-propylene ketals and the like.

PREPARATION 7

5α,6α - oxido - 17α - hydroxypregnane - 3,20 - dione 17-acetate, 3 - ethylene ketal A solution of 17α-hydroxyprogesterone 17-acetate, 3-ethylene ketal, dissolved in 230 milliliters of benzene, was treated with stirring at six degrees to eight degrees centigrade, with 42 milliliters of cold forty percent peracetic acid containing 4.2 grams of sodium acetate. The mixture was allowed to stir overnight at room temperature, the layers were then separated, the peracetic acid layer after dilution with water was extracted with benzene three times and the combined benzene layers were washed with cold dilute sodium hydroxide and water and thereupon dried over anhydrous sodium sulfate. The dried benzene solution was then evaporated to dryness and the thus obtained residue recrystallized once from methylene chloride-ether and then from ethyl acetate to give 2.7 grams of the α-epoxide, 5α,6α-oxido-17α-hydroxypregnane-3,20-dione 17α-acetate, 3-ethylene ketal of melting point 224 to 228 degrees centigrade and rotation [α]$_D$ minus 63 degrees in chloroform.

Analysis.—Calcd. for $C_{25}H_{38}O_6$: C, 69.41; H, 8.40. Found: C, 69.46; H, 8.81.

PREPARATION 8

5α,6α - oxido - 17α - hydroxypregnane - 3,20 - dione 17-phenylacetate, 3 - ethylene ketal A solution was prepared by heating five grams of 17α-hydroxyprogesterone 17-phenylacetate, 3-ethylene ketal and 125 milliliters of benzene. After the solution was effected the flask was cooled to five degrees centigrade and a mixture of one gram of sodium acetate and 25 milliliters of peracetic acid solution (40 percent) was added with stirring. The reaction mixture was stirred in the ice bath for five hours. The lower peracid layer was separated, diluted with water, and extracted twice with benzene. The upper layer was neutralized by the addition of cold ten percent sodium hydroxide solution while stirring in an ice bath. The rate of addition of the sodium hydroxide was regulated to keep the temperature below ten degrees centigrade. The lower layer was then extracted with benzene and the combined benzene extracts washed with cold ten percent sodium hydroxide solution and then with saturated sodium chloride solution. All the aqueous layers were washed again with the same portion of benzene. The combined benzene layers were dried over anhydrous magnesium sulfate and concentrated to dryness at reduced pressure. The residue was recrystallized from acetone and methylene chloride and then from ethyl acetate to give 5α,6α-oxido-17α-hydroxypregnane-3,20-dione 17-phenylacetate, 3-ethylene ketal.

PREPARATION 9

5α,6α - oxido - 17α - hydroxypregnane - 3,20 - dione 17-acetate, 3-propylene ketal In the same manner given in Preparation 8, reacting 17α-hydroxyprogesterone 17-acetate, 3-propylene ketal with peracetic acid and anhydrous sodium acetate in chloroform solution produced 5α,6α-oxido-17α-hydroxypregnane-3,20-dione 17-acetate, 3-propylene ketal.

In the same manner as shown in Preparations 8 and 9 other 5α,6α-oxido-17α-hydroxypregnane-3,20-dione 17-acylates, 3-ketals are prepared by reacting the corresponding 17α-hydroxyprogesterone 17-acylate ketals with a peracid, such as performic, peracetic, perpropionic, perbenzoic, perlauric or monoperphthalic acid, at low temperatures usually between minus ten and plus ten degrees centigrade. Representative compounds thus prepared comprise: 5α,6α-oxido-17α-hydroxypregnane-3,20-dione, 17-caproate, 3-(1,3-propylene ketal); 5α,6α-oxido-17α-hydroxypregnane-3,20-dione 17-formate, 3-(1,2-butylene ketal); 5α,6α-oxido-17α-hydroxypregnane-3,20-dione 17-propionate, 1,2-, 2,3-, 2,4- and 1,3-pentylene ketals; 5α,6α-oxido-17α-hydroxypregnane-3,20-dione 17-phenylpropionate, 3-ethylene ketal; 5α,6α-oxido-17α-hydroxypregnane-3,20-dione 17-(β-cyclopentylproprionate), 17-butyrate and 17-valerate, 3-ethylene ketal; 5α,6α-oxido-17α-hydroxypregnane-3,20-dione 17-benzoate, 3-propylene ketal; 5α,6α-oxido-17α-hydroxypregnane-3,20- dione 17-hexanoate and cyclohexylformate, 3-ethylene ketals; 5α,6α-oxido-17α-hydroxypregnane-3,20-dione 17-laurate, 3-ethylene and 3-propylene ketals and the like.

PREPARATION 10

*5α,17α-dihydroxy-6β-fluoropregnane-3,20 - dione 17-acetate, 3-ethylene ketal*

A solution of one gram of 5α,6α-oxido-17α-hydroxypregnane-3,20-dione 17-acetate, 3-ethylene ketal in seven milliliters of acetic acid and one-half milliliter of acetic anhydride was stirred with 2.1 grams of powdered potassium bifluoride at room temperature for a period of two days. Thereafter the reaction mixture was diluted with fifty milliliters of methylene chloride and the methylene chloride solution washed three times with fifty milliliters of water. The methylene chloride solution was then dried over anhydrous sodium sulfate and evaporated to dryness to give crude 5α,17α-dihydroxy-6β-fluoropregnane-3,20-dione 17-acetate, 3-ethylene ketal.

PREPARATION 11

*5α,17α - dihydroxy - 6β - fluoropregnane - 3,20 - dione 17-phenylacetate, 3-ethylene ketal*

A solution of 400 milligrams of 5α,6α-oxido-17α-hydroxypregnane-3,20-dione 17-phenylacetate, 3-ethylene ketal in five milliliters of alcohol-free chloroform was cooled to minus fifteen degrees centigrade. To the cooled solution was added 2.5 milliliters of an ice salt solution of about 100 milligrams of anhydrous hydrogen fluoride in five milliliters of alcohol-free chloroform. The reaction mixture was stored at minus fifteen degrees centigrade for four hours with occasional stirring. The solution was then washed at about zero degrees centigrade with aqueous sodium bicarbonate and then with water. The washed chloroform solution was dried and then distilled to dryness, leaving a residue of 5α,17α-dihydroxy-6β-fluoropregnane-3,20-dione 17-phenylacetate, 3-ethylene ketal.

PREPARATION 12

*5α,17α-dihydroxy-6β-fluoropregnane-3,20-dione 17-acetate, 3propylene ketal*

In a fifty milliliter polyethylene bottle, cooled with Dry Ice-acetone, was placed 3.5 grams of anhydrous hydrogen fluoride, followed slowly with 2.5 milliliters of chilled chloroform and seven milliliters of tetrahydrofuran. To this solution was added two grams of 5α,6α-oxido-17α-hydroxypregnane - 3,20 - dione 17 - acetate, 3-propylene ketal. The violet solution was then kept for two hours at minus ten degrees centigrade and then poured into excess aqueous sodium bicarbonate. The product was extracted from the aqueous mixture with three 25-milliliter portions of methylene chloride, the methylene chloride extracts combined, washed three times with water, evaporated to dryness and the thus obtained material twice recrystallized from ethylene chloride and ethyl acetate to give 5α,17α-dihydroxy-6β-fluoropregnane-3,20-dione 17-acetate, 3-propylene ketal.

In the same manner as shown in Preparations 10 through 12, inclusive, treating other 5α,6α-oxido-17α-hydroxypregnane-3,20-dione 17-acylates 3-alkylene ketals with hydrogen fluoride, either in the free state or produced in situ, results in the corresponding 5α,17α-dihydroxy - 6β - fluoropregnane - 3,20 - dione 17 - acylate, 3-alkylene ketal. Representative compounds thus prepared comprise 5α,17α-dihydroxy-6β-fluoro-3,20-dione 17-caproate 3 - (1,3 - propylene ketal); 5α,17α-dihydroxy-6β - fluoropregnane - 3,20 - dione 17 - formate, 3 - (1,2-, 2,3- and 1,3-butylene ketals); 5α,17α-dihydroxy-6β-fluoropregnane-3,20-dione 17-propionate, 1,2-, 2,3-, 2,4- and 1,3-pentylene ketals; 5α,17α-dihydroxy - 6β - fluoropregnane-3,20-dione 17-phenylpropionate, 3-ethylene ketals; 5α,17α - dihydroxy - 6β - fluoropregnane - 3,20 - dione 17-(β-cyclopentylpropionate), 17-butyrate and 17-valerate, 3 - ethylene ketals; 5α,17α - dihydroxy - 6β - fluoropregnane-3,20-dione 17-benzoate, 3-propylene ketal; 5α,17α-dihydroxy - 6β - fluoropregnane - 3,20 - dione 17-hexanoate and cyclohexylformate, 3-ethylene ketals; 5α,17α - dihydroxy - 6β - fluoropregnane - 3,20 - dione 17-laurate, 3-ethylene and 3-propylene ketals and the like.

PREPARATION 13

*5α,17α-dihydroxy-6β-fluoropregnane-3,20-dione 17-acetate*

The crude 5α,17α-dihydroxy-6β-fluoropregnane-3,20-dione 17-acetate, 3-ethylene ketal of Preparation 10 was dissolved in twenty milliliters of 95 percent ethanol and thereto was added 0.5 milliliter of one normal sulfuric acid. The mixture was warmed for a period of twenty minutes then diluted with 100 milliliters of water and the precipitated material collected and filtered. The thus produced 5α,17α - dihydroxy - 6β - fluoropregnane - 3,20-dione 17-acetate was recrystallized from ethanol and had a melting point of 260 to 262 degrees centigrade.

PREPARATION 14

*5α,17α-dihydroxy-6β-fluoropregnane-3,20-dione 17-phenylacetate*

A solution was prepared containing ten grams of 5α,17α - dihydroxy - 6β - fluoropregnane - 3,20 - dione 17-phenylacetate, 3-ethylene ketal in 100 milliliters of boiling acetone. Thereto was added ten milliliters of one normal sulfuric acid in portions under swirling and seeding with product. Boiling was continued for a period of two minutes and the mixture was allowed to stand at room temperature. Thereafter the mixture was diluted with 400 milliliters of water, chilled and filtered. The precipitate was washed with water, dilute ammonium hydroxide and water, dried in a vacuum oven overnight, and then twice recrystallized from acetone to give 5α,17α-dihydroxy - 6β - fluoropregnane - 3,20 - dione 17 - phenylacetate.

PREPARATION 15

*6α-fluoro-17α-hydroxyprogesterone 17-acetate*

A solution of 87 milligrams of 5α,17α-dihydroxy-6β-fluoropregnane-3,20-dione 17-acetate, dissolved in five milliliters of chloroform, was cooled in an ice salt bath. This solution was saturated with hydrogen chloride gas for a period of thirty minutes. Thereafter the mixture was washed with three twenty-milliliter portions of water to render the solution neutral. Thereafter the solution was dried over anhydrous magnesium sulfate, and evaporated to dryness to give a crystalline material which was recrystallized from ethyl acetate to give 6α-fluoro-17α-hydroxyprogesterone 17-acetate of melting point 253 to 256 degrees centigrade and rotation [α]$_D$ plus 66 degrees in chloroform $$\lambda_{max}^{alc} 235 \, m\mu; \, A_m = 15,575$$

*Analysis.*—Calcd. for $C_{23}H_{31}FO_3$: F, 5.07 Found: F, 5.23.

PREPARATION 16

*6α-fluoro-17α-hydroxyprogesterone 17-phenylactate*

In the same manner given in Preparation 15, dehydrating 5α,17α-dihydroxy-6β-fluoropregnane-3,20-dione 17-phenylpropionate resulted in 6α-fluoropregnane-3,20-dione 17-phenylacetate.

PREPARATION 17

*6β-fluoro-17α-hydroxyprogesterone 17-acetate*

To a solution of 200 milligrams of 5α,17α-dihydroxy-6β-fluoropregnane-3,20-dione 17-acetate in forty milliliters of 95 percent ethanol was added two milliliters of 0.1 normal sodium hydroxide solution. The mixture was kept for four hours at a temperature of about 35 degrees centigrade and thereupon neutralized with a few drops of acetic acid and poured into 100 milliliters of ice water. The precipitated crude 6β-fluoro-17α-hydroxyprogesterone 17-acetate was recrystallized twice from ethyl acetate-Skellysolve B hexane to give pure 6β-fluoro-17α-hydroxyprogresterone 17-acetate of melting point 196 to 199 degrees centigrade and rotation [α]$_D$ minues 19 degrees (chloroform).

In the same manner given in Preparation 17, treating other 5α,17α-dihydroxy-6β-fluoropregnane-3,20-dione 17-acylates with dilute alkali or dilute acids under mild conditions produces the corresponding 6β-fluoro-17α-hydroxyprogesterone acylates. In this manner are produced the following representative compounds: 6β-fluoro-17α-hydroxyprogesterone 17-caproate, formate, propionate, isobutyrate, valerate, octanoate, decanoate, laurate, acrylate, crotonate, benzoate, phenylpropionate, phenylacetate, trimethylacetate, β-cyclopentylpropionate, hemisuccinate, β,β-dimethylglutarate and the like.

PREPARATION 18

6α-fluoro-17α-hydroxyprogesterone

A solution of 6α-fluoro-17α-hydroxyprogesterone 17-acetate (200 milligrams) in four milliliters of 95 percent ethanol and 0.5 milliliter of water containing 100 milligrams of potassium hydroxide was allowed to stand at room temperature (approximately 25 degrees centigrade). Thereafter the mixture was neutralized by the addition of sufficient acetic acid and poured into fifty milliliters of ice water. The ice water solution was extracted with three ten-milliliter portions of methylene chloride. The methylene chloride solutions were combined, washed with water, dried over anhydrous sodium sulfate and evaporated. The thus obtained residue was recrystallized three times from methanol to give 6α-fluoro-17α-hydroxyprogesterone.

In the same manner as shown in Preparation 18 other 6α-fluoro-17α-hydroxyprogesterone 17-acylates can be hydrolyzed at room temperature with a base such as sodium or potassium hydroxide, sodium or potassium carbonate or the like to give 6α-fluoro-17α-hydroxyprogesterone.

The 6β-fluoro epimer, 6β-fluoro-17α-hydroxyprogesterone, is obtained by treating 6β-fluoro-17α-hydroxyprogesterone 17-acetate with on equivalent of anhydrous potassium methoxide in absolute methanol, allowing to stand for 15 minutes and adding one equivalent of water. Thereafter the aqueous mixture is neutralized with hydrochloric acid, diluted with water and filtered. The crude material is purified by recrystallization from methanol to give pure 6β-fluoro-17α-hydroxyprogesterone.

EXAMPLE 1

6α-fluoro-17α-hydroxyallopregnane - 3,20 - dione and 6α-fluoro-17α-hydroxypregnane-3,20-dione (Normal)

A solution of five grams of 6α-methyl-17α-hydroxyprogesterone in 200 milliliters of 95 percent ethanol, containing 0.5 gram of five percent palladium on charcoal, was hydrogenated at room temperature (about 25 degrees centrigrade) and thirty pounds pressure until the uptake of hydrogen ceased. The catalyst was removed by filtration and the precipitated material washed with alcohol and the washings added to the filtrate. The filtrate was thereupon evaporated to dryness. The residue was dissolved in 25 milliliters of hot methanol containing three milliliters of pyrrolidine, refluxed two minutes under nitrogen, and scratched or seeded. A crystalline precipitate consisting of the 3-enamine of 6α-fluoro-17α-hydroxyallopregnane-3,20-dione precipitated and was collected, washed with cold methanol and dried. The enamine group was removed by dissolving the 3-enamine of 6α-fluoro-17α-hydroxyallopregnane-3,20-dione in methanol containing two percent aqueous sodium hydroxide and warming the solution to fifty degrees centigrade for a period of twenty minutes. After neutralizing with acetic acid, the solvent was removed by evaporation, the residue was taken up in ether and water and the ether layer concentrated to dryness. Recrystallization of the crude 6α-fluoro-17α-hydroxyallopregnane-3,20-dione gave the pure product 6α-fluoro-17α-hydroxyallopregnane-3,20-dione.

The 3-enamine of 6α-fluoro-17α-hydroxypregnane-3,20-dione (normal) does not precipitate and can be obtained from the solution from which the enamine of the allo compounds have been removed in conventional manner: i. e. by adding two milliliters of two percent aqueous sodium hydroxide and heating for twenty minutes to fifty degrees, neutralizing with acetic acid and removing the solvent by evaporation. The thus obtained residue is dissolved in methylene chloride and water and the methylene chloride layer separated and evaporated to dryness to give crude 6-fluoro-17α-hydroxypregnane-3,20-dione (normal) which is recrystallized from acetone and Skellysolve B to give the pure 6-fluoro-17α-hydroxypregnane-3,20-dione.

In the same manner as shown in Example 1 hydrogenating 6β - fluoro - 17α - hydroxyprogesterone affords the 6β - fluoro - 17α - hydroxyallopregnane - 3,20 - dione and 6β - fluoro - 17α - hydroxypregnane - 3,20 - dione (normal).

EXAMPLE 2

2-bromo-6α-fluoro-17α-hydroxyallopregnane-3,20-dione

A solution containing 14.5 grams of bromine in 150 milliliters of glacial acetic acid was added with slow stirring to 30.5 grams of 6α - fluoro - 17α - hydroxyallopregnane-3,20-dione, dissolved in three liters of acetic acid to which was added a few drops of 4 normal hydrogen bromide solution in acetic acid. A few minutes after the addition had been completed water was added and the resulting precipitate collected by filtration, washed with water, dried over anhydrous sodium sulfate and recrystallized from ethanol to give the 2-bromo-6α-fluoro-17α-hydroxyallopregnane-3,20-dione.

In the same manner as shown in Example 2, using 6β-fluoro - 17α - hydroxyallopregnane - 3,20 - dione instead of the 6α - epimer and brominating with bromine in glacial acetic acid in the presence of hydrogen bromide produces the 2 - bromo - 6β - fluoro - 17α - hydroxyallopregnane-3,20-dione.

EXAMPLE 3

2,4-dibromo-6α-fluoro-17α-hydroxyallopregnane-3,20-dione

In the same manner as shown in Example 2, reacting 6α - fluoro - 17α - hydroxyallopregnane - 3,20 - dione with bromine however, using thirty grams of bromine for 30.5 grams of steroid in the presence of one milliliter of four normal hydrogen bromide solution in acetic acid and allowing the mixture to stand overnight resulted in 2,4-dibromo - 6α - fluoro - 17α - hydroxyallopregnane - 3,20-dione which was recovered by adding water to the reaction mixture to precipitate the crude compound, recovering the precipitate by filtration, washing the precipitate with water and drying it. The crude material was recrystallized from ethyl acetate Skellysolve B to give pure 2,4 - dibromo - 6α - fluoro - 17α - hydroxyallopregnane-3,20 - dione.

In the same manner using the 6β-isomer, 6β-fluoro-17α-hydroxyallopregnane-3,20-dione and treating with two moles of bromine per mole of steroid in acetic acid in the presence of hydrogen bromine resulted in the 2,4-dibromo-6β-fluoro-17α-hydroxyallopregnane-3,20-dione.

EXAMPLE 4

6α-fluoro-17α-hydroxy-1-allopregnene-3,20-dione

A solution was prepared containing in 210 milliliters of redistilled dimethylformamide twenty-one grams of 2 - bromo - 6α - fluoro - 17α - hydroxyallopregnane-3,20-dione. The mixture was heated on the water bath for two hours, was thereupon cooled and poured into cold water. The aqueous reaction mixture was then extracted with 250 milliliter portions of methylene chloride. The methylene chloride solution was washed with three 100 milliliter portions of water, dried over anhydrous sodium sulfate and evaporated to a small volume. The solution was then diluted to 700 milliliters with Skellysolve B and chromatographed over 500 grams of Florisil anhydrous magnesium silicate. Volumes of 700 milliliters of Skellysolve B hexanes containing increasing proportions of acetone were used for chromatography. Those fractions exhibiting a $\lambda_{max}^{alc}$ at 228 to 232 millimicrons were combined, concentrated to dryness and the thus-obtained dry residue recrystallized to give pure 6α-fluoro-17α-hydroxy-1-allopregnene-3,20-dione.

In like manner the 6β-isomer, 6β-fluoro-17α-hydroxy-1-allopregnene-3,20-dione was prepared by dehydrobrominating with dimethylformamide the corresponding 2-bromo-6β-fluoro-17α-hydroxyallopregnane-3,20-dione.

EXAMPLE 5

*6α-fluoro 17α-hydroxy-1-allopregnene-3,20-dione 17-acetate*

(A) In the same manner as shown in Example 1 6α-fluoro-17α-hydroxyprogesterone 17-acetate was hydrogenated with hydrogen in the presence of a palladium catalyst suspended on charcoal to give the 6α-fluoro-17α-hydroxyallopregnane-3,20-dione 17α-acetate.

In the same manner as shown in Example 2 6α-fluoro-17α-hydroxyallopregnane-3,20-dione 17-acetate was brominated with bromine and glacial acetic acid in the presence of hydrogen bromide to give the corresponding 2-bromo-6α-fluoro-17α-hydroxyallopregnane-3,20-dione 17-acetate.

In the same manner as shown in Example 4 dehydrobrominating with dimethylformamide the 2-bromo-6α-fluoro-17α-hydroxyallopregnane-3,20-dione 17-acetate results in 6α-fluoro-17α-hydroxy-1-allopregnene-3,20-dione 17-acetate.

(B) A solution of one gram of 6α-fluoro-17α-hydroxy-1-allopregnene-3,20-dione in twenty milliliters of acetic anhydride and one gram of para-toluene sulfonic acid was allowed to stand overnight for eighteen hours at a temperature of about 22 degrees centigrade. The solution was diluted with twenty milliliters of methanol and 0.3 milliliter of concentrated hydrochloric acid and was refluxed for one hour under nitrogen. Twenty milliliters of pyridine was added and the mixture was evaporated to dryness. The crude product was recrystallized from methanol to give 6α-fluoro-17α-hydroxy-1-allopregnene-3,20-dione 17-acetate.

In the same manner as shown in Example 5 using either the method described under (A) or the method described under (B) other esters of 6α-fluoro-17α-hydroxy-1-allopregnene-3,20-dione are obtained such as the 17-propionate, butyrate, valerate, hexanoate, hyptanoate, octanoate, benzoate, phenylacetate, β-cyclopentylpropionate, trimethylacetate, laurate, decanoate, cinnamate, propiolate. To obtain esters of unsaturated acid such as the 6α-fluoro-17α-acetoxy-1-allopregnene-3,20-dione 17-acrylate, crotonate, undecylenate, propiolate, 2-butynoate, undecolate, or the like or ester of dibasic unsaturated acids such as the maleate, citraconate, direct acylation of the 6α-fluoro-17α-hydroxy-1-allopregnene-3,20-dione (method B) is preferred since in the other method bromination may occur on the unsaturated acid without subsequent removal of hydrogen bromide in the acyl group.

Using as starting material 6β-isomers such as 6β-fluoro-17α-hydroxy-1-allopregnene-3,20-dione in the method of Example 5B produces the acetate, propionate, benzoate, phenylacetate, phenylpropionate, cinnamate and other esters of 6β-fluoro-17α-hydroxy-1-allopregnene-3,20-dione.

EXAMPLE 6

*6α-fluoro-17α-hydroxy-1,4-pregnadiene-3,20-dione*

A solution of ten grams of 2,4-dibromo-6α-fluoro-17α-hydroxyallopregnane-3,20-dione was heated for two hours in 100 milliliters of redistilled dimethylformamide and ten grams of lithium chloride, then cooled, poured into cold water and the aqueous solution extracted with methylene dichloride. The methylene chloride solution was washed thoroughly with water, dried, evaporated over anhydrous sodium sulfate, and chromatographed over 500 grams of Florisil anhydrous magnesium silicate and was eluted with Skellysolve B hexanes containing increasing proportions of acetone as described before.

The fractions showing a $\lambda_{max}^{alc}$ at 238 to 246 millimicrons where combined, evaporated to give a residue and the thus obtained residue several times recrystallized from methanol to give 6α-fluoro-17α-hydroxy-1,4-pregnadiene-3,20-dione.

EXAMPLE 7

*6α - fluoro - 17α - hydroxy - 1,4 - pregnadiene - 3,20-dione 17-acetate*

One gram of 6α-fluoro-17α-hydroxy-1,4-pregnadiene-3,20-dione was refluxed for twelve hours with acetic anhydride and the solvent removed under a vacuum. The thus obtained residue was dissolved in methylene chloride, washed with aqueous sodium carbonate, dried over anhydrous sodium sulfate, the solution concentrated to a small volume and the material chromatographed over thirty grams of Florisil using fifty milliliter portions of solvents. The product was eluted first with Skellysolve B containing increasing proportions of acetone. The crystalline fractions were combined and recrystallized to give 6α-fluoro-17α-hydroxy-1,4-pregnadiene-3,20-dione 17-acetate of melting point 255 to 258 degrees centigrade.

EXAMPLE 8

*6α-fluoro-17α-hydroxy-1,4-pregnadiene-3,20-dione 17-acetate*

A mixture containing ten grams of 6α-fluoro-17α-hydroxy-4-pregnene-3,20-dione 17-acetate in 500 milliliters of tertiary butyl alcohol, five milliliters of glacial acetic acid and four grams of selenium dioxide was warmed at reflux for 24 hours. An additional four gram portion of the selenium dioxide was added and warming was continued for another 24 hour period. The reaction mixture was then cooled and filtered. The filtrate was concentrated to about 150 milliliters and then slowly diluted with 850 milliliters of water. The resulting precipitate was isolated by filtration. The precipitate was dissolved in 300 milliliters of ethyl acetate, then washed with 400 milliliter portions of freshly prepared cold ammonium sulfide, dilute ammonium hydroxide, then water, then dilute hydrochloric acid and water. The solution was then dried over anhydrous sodium sulfate and evaporated to give about nine grams of crude 6α-fluoro-17α-hydroxy-1,4-pregnadiene-3,20-dione 17-acetate. The crude material was purified by recrystallization from Skellysolve B hexanes and acetone.

EXAMPLE 9

*6α-fluoro-17α-hydroxy-1-allopregnene-3,20-dione*

Twelve liters of a medium consisting of one percent Cerelose dextrose, two percent corn steep liquor of sixty percent solids, were adjusted to a pH of 4.9 with sodium hydroxide. Ten milliliters of lard oil containing 0.1 to two percent octadecanol was added to prevent foaming. The medium was steam sterilized at fifteen pounds pressure for thirty minutes. Upon cooling the sterile medium was inoculated with a 24-hour growth of spores of *Septomyxa affinis* A. T. C. C. 6737. The medium was agitated, and sparged with sterile air at the rate of one liter of air per minute. After culturing at room temperature for 24 hours, the pH was about 7.3. To this 24-hour culture there was added six grams of 6α-fluoro-17α-hydroxyallopregnane-3,20-dione, dissolved in 130 milliliters of acetone. Fermentation of the 6α-fluoro-17α-hydroxyallopregnane-3,20-dione was maintained for 24 hours. The fermentation broth was then strained through gauze to separate the mycelium. The mycelium was washed once with one liter of acetone and then twice with one-liter portion of methylene chloride. The acetone and methylene chloride washings were combined with an additional four liters of methylene chloride and this seven liters of extract and solvent was then used to extract the filtered beer. Upon separation of the extract from the beer, the beer was twice more extracted with three-liter volumes of methylene chloride. All of the acetone and methylene chloride extracts were combined and washed with 1200 milliliters of two percent sodium bicarbonate solution, and then with 1200 milliliters of water. The washed solvent extract was then dried with anhydrous sodium sulfate and evaporated to leave seven grams of extract. The extract was dissolved in 230 milliliters of benzene and fractionated over a column of 300 grams of alumina using 230-milliliter portions of developing solvent (Skellysolve B containing increasing proportions of acetone). Those fractions exhibiting a $\lambda_{max}^{alc}$ at 228 to 232 millimicrons were combined, evaporated to a residue and the residue recrystallized two times from methanol to give pure 6α-fluoro-17α-hydroxy-1-allopregnene-3,20-dione.

EXAMPLE 10

*6α-fluoro-17α-hydroxy-1,4-pregnadiene-3,20-dione 17-benzoate*

A mixture containing two grams of 6α-fluoro-17α-hydroxyprogesterone 17-benzoate five milliliters of glacial acetic acid, four grams of selenium dioxide and four grams of mercury was warmed up for a period of 24 hours. The reaction mixture was then cooled and filtered. The filtrate was concentrated to twenty milliliters and then diluted with 150 milliliters of water. The resulting precipitate was recovered by filtration. The precipitate was then dissolved in sixty milliliters of ethyl acetate and washed with four 25 milliliter portions of freshly prepared cold ammonium sulfide, dilute ammonium hydroxide, water, dilute hydrochloric acid and water. The solution was then dried over anhydrous sodium sulfate and evaporated to give a residue which was twice recrystallized from Skellysolve B hexane hydrocarbons and acetone to give pure 6α-fluoro-17α-hydroxy-1,4-pregnadiene-3,20-dione 17-benzoate.

EXAMPLE 11

*6α-fluoro-17α-hydroxy-1,4-pregnadiene-3,20-dione*

In the same manner as in Example 9 6α-fluoro-17α-hydroxyprogesterone can be converted with *Septomyxa affinis* A. T. C. C. 6737 in a nutrient solution containing assimilable carbon, nitrogen, phosphorus to give the corresponding 1-dehydro compound, 6α-fluoro-17α-hydroxy-1,4-pregnadiene-3,20-dione.

EXAMPLE 12

*6α-fluoro-17α-hydroxy-1-pregnene-3,20-dione*

In the same manner given in Example 9, 6α-fluoro-17α-hydroxypregnane-3,20-dione can be converted with *Septomyxa affinis* A. T. C. C. 6737 in a nutrient solution containing assimilable carbon, nitrogen and phosphorus to give 6α-fluoro-17α-hydroxy-1-pregnene-3,20-dione.

In the same manner as shown in Example 5, reacting 6α-fluoro-17α-hydroxy-1-pregnene-3,20-dione with acetic anhydride, propionic anhydride, or other acid anhydrides produces the corresponding ester such as the 17-acetate, 17-propionate, or the like of 6α-fluoro-17α-hydroxy-1-pregnene-3,20-dione.

EXAMPLE 13

*6α-fluoro-17α-hydroxy-1-allopregnene-3,20-dione 17-(β-cyclopentylpropionate)*

A mixture of one gram of 6α-fluoro-17α-hydroxy-1-allopregnene-3,20-dione and four milliliters of β-cyclopentylpropionic acid is heated to eighty degrees centigrade in the presence of one milliliter of trifluoroacetic anhydride for a period of 45 minutes. The mixture is then poured into excess of water, neutralized by the addition of sodium carbonate and the thus formed material extracted with ether. The ether solution is washed, dried over anhydrous magnesium sulfate, and evaporated to give the residue. The thus obtained residue is purified by recrystallization from methanol to give pure 6α-fluoro-17α-hydroxy-1-allopregnene-3,20-dione 17-(β-cyclopentylpropionate).

In the same manner as given in Example 12, reacting 6α-fluoro-17α-hydroxy-1,4-pregnadiene-3,20-dione and 6α-fluoro-17α-hydroxy-1-pregnene-3,20-dione with β-cyclopentylpropionic acid in the presence of trifluoroacetic anhydride yield the corresponding 17-(β-cyclopentylpropionates) of 6α-fluoro-17α-hydroxy-1,4-pregnadiene-3,20-dione and 6α-fluoro-17α-hydroxy-1-pregnene-3,20-dione.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of 6-fluoro-17α-hydroxy-1-allopregnene-3,20-dione and 6-fluoro-17α-hydroxy-1-allopregnene-3,20-dione 17-acylate wherein the acyl group is of a hydrocarbon carboxylic acid containing from one to twelve carbon atoms, inclusive.

2. 6α-fluoro-17α-hydroxy-1-allopregnene-3,20-dione.

3. 6β-fluoro-17α-hydroxy-1-allopregnene-3,20-dione.

4. 6-fluoro-17α-hydroxy-1-allopregnene-3,20-dione 17-acylates wherein the acyl group is of a hydrocarbon carboxylic acid containing from one to twelve carbon atoms, inclusive.

5. 6α-fluoro-17α-hydroxy-1-allopregnene-3,20-dione 17-acetate.

6. A compound selected from the group consisting of 6-fluoro-17α-hydroxy-1,4-pregnadiene-3,20-dione and 6-fluoro-17α-hydroxy-1,4-pregnadiene-3,20-dione 17-acylate, wherein the acyl group is of a hydrocarbon carboxylic acid, containing from one to twelve carbon atoms, inclusive.

7. 6α-fluoro-17α-hydroxy-1,4-pregnadiene-3,20-dione.

8. 6-fluoro-17α-hydroxy-1,4-pregnadiene-3,20-dione 17-acylate, wherein the acyl group is of a hydrocarbon carboxylic acid containing from one to twelve carbon atoms, inclusive.

9. 6α-fluoro-17α-hydroxy-1,4-pregnadiene-3,20-dione 17-acetate.

10. 6α-fluoro-17α-hydroxyallopregnane-3,20-dione.

No references cited.